United States Patent
Usumezbas et al.

(10) Patent No.: US 12,062,174 B2
(45) Date of Patent: Aug. 13, 2024

(54) FULLY AUTOMATED MULTIMODAL SYSTEM ARCHITECTURE FOR SEMANTIC SEGMENTATION OF LARGE-SCALE 3D OUTDOOR POINT CLOUD DATA

(71) Applicant: SRI International, Menlo Park, CA (US)

(72) Inventors: Anil Usumezbas, North Brunswick, NJ (US); Bogdan Calin Mihai Matei, Princeton, NJ (US); Rakesh Kumar, West Windsor, NJ (US); Supun Samarasekera, Skillman, NJ (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 17/476,377

(22) Filed: Sep. 15, 2021

(65) Prior Publication Data

US 2022/0222824 A1    Jul. 14, 2022

Related U.S. Application Data

(60) Provisional application No. 63/078,444, filed on Sep. 15, 2020.

(51) Int. Cl.
*G06T 7/10* (2017.01)
*G06T 3/40* (2024.01)
(Continued)

(52) U.S. Cl.
CPC .................. *G06T 7/10* (2017.01); *G06T 3/40* (2013.01); *G06T 17/205* (2013.01);
(Continued)

(58) Field of Classification Search
CPC .................. G06T 17/05; G06T 17/205; G06T 2207/10028; G06T 2207/20072;
(Continued)

(56) References Cited

U.S. PATENT DOCUMENTS

| | | | |
|---|---|---|---|
| 2009/0310867 A1* | 12/2009 | Matei | G06T 7/11 382/195 |
| 2011/0181589 A1* | 7/2011 | Quan | G06T 17/05 345/420 |

(Continued)

FOREIGN PATENT DOCUMENTS

| | | | | |
|---|---|---|---|---|
| CN | 110197215 A | * | 9/2019 | ........... G06F 18/214 |
| CN | 111598803 A | * | 8/2020 | ............. G06T 5/002 |

OTHER PUBLICATIONS

Çiçek, Ö., & Abdulkadir, A., & Lienkamp, S. S., & Brox, T., & Ronneberger, O. (2016). 3D U-Net: Learning Dense Volumetric Segmentation from Sparse Annotation. International Conference on Medical Image Computing and Computer-Assisted Intervention, (pp. 424-432).

(Continued)

*Primary Examiner* — Ming Wu
(74) *Attorney, Agent, or Firm* — MOSER TABOADA

(57) ABSTRACT

A method, machine readable medium and system for semantic segmentation of 3D point cloud data includes determining ground data points of the 3D point cloud data, categorizing non-ground data points relative to a ground surface determined from the ground data points to determine legitimate non-ground data points, segmenting the determined legitimate non-ground and ground data points based on a set of common features, applying logical rules to a data structure of the features built on the segmented determined non-ground and ground data points based on their spatial relationships and incorporated within a machine learning system, and constructing a 3D semantics model from the application of the logical rules to the data structure.

20 Claims, 12 Drawing Sheets
(4 of 12 Drawing Sheet(s) Filed in Color)

(51) Int. Cl.
G06T 17/20 (2006.01)
G06V 10/776 (2022.01)
G06V 20/70 (2022.01)

(52) U.S. Cl.
CPC ............ *G06V 10/776* (2022.01); *G06V 20/70* (2022.01); *G06T 2207/10028* (2013.01); *G06T 2207/20072* (2013.01); *G06T 2207/20081* (2013.01); *G06T 2207/20221* (2013.01); *G06T 2207/30181* (2013.01); *G06T 2210/56* (2013.01)

(58) Field of Classification Search
CPC . G06T 2207/20081; G06T 2207/20221; G06T 2207/30181; G06T 2210/56; G06T 3/40; G06T 7/10
See application file for complete search history.

(56) References Cited

U.S. PATENT DOCUMENTS

| | | | | |
|---|---|---|---|---|
| 2017/0254911 | A1* | 9/2017 | Can | G01V 1/345 |
| 2018/0059666 | A1* | 3/2018 | Izzat | G01S 17/931 |
| 2020/0265552 | A1* | 8/2020 | Hemmer | G06T 17/205 |

OTHER PUBLICATIONS

Zhou, Y., & Tuzel, O. (2018). Voxelnet: End-to-end Learning for Point Cloud Based 3D Object Detection. Proceedings of the IEEE Conference on Computer Vision and Pattern Recognition (CVPR), (pp. 4490-4499).

Tatarchenko, M., & Dosovitskiy, A., & Brox, T. (2017). Octree Generating Networks: Efficient Convolutional Architectures for High-Resolution 3D Outputs. Proceedings of the IEEE International Conference on Computer Vision (ICCV), (pp. 2088-2096).

Qi, C. R., & Su, H., & Mo, K., & Guibas, L. J. (2017). Pointnet: Deep Learning on Point Sets for 3D Classification and Segmentation. Proceedings of the IEEE Conference on Computer Vision and Pattern Recognition (CVPR), (pp. 652-660).

Su, H., & Jampani, V., & Sun, D., & Maji, S., & Kalogerakis, E., & Yang, M. H., & Kautz, J. (2018). Splatnet: Sparse Lattice Networks for Point Cloud Processing. Proceedings of the IEEE Conference on Computer Vision and Pattern Recognition (CVPR), (pp. 2530-2539).

Landrieu, L., & Simonovsky, M. (2018). Large-scale Point Cloud Semantic Segmentation with Superpoint Graphs. Proceedings of the IEEE Conference on Computer Vision and Pattern Recognition (CVPR), (pp. 4558-4567).

Girshick, R., & Donahue, J., & Darrell, T., & Malik, J. (2014). Rich Feature Hierarchies for Accurate Object Detection and Semantic Segmentation. Proceedings of the IEEE Conference on Computer Vision and Pattern Recognition (CVPR), (pp. 580-587).

Xiao, T., & Liu, Y., & Zhou, B., & Jiang, Y., & Sun, J. (2018). Unified Perceptual Parsing for Scene Understanding. Proceedings of the European Conference on Computer Vision (ECCV), (pp. 418-434).

Zhou, B., & Zhao, H., & Puig, X., & Fidler, S., & Barriuso, A., & Torralba, A. (2017). Scene Parsing Through ADE20K Dataset. Proceedings of the IEEE Conference on Computer Vision and Pattern Recognition (CVPR), (pp. 633-641).

Zhou, B., & Zhao, H., & Puig, X., & Xiao, T., & Fidler, S., & Barriuso, A., & Torralba, A. (2019). Semantic Understanding of Scenes Through the ADE20K Dataset. International Journal of Computer Vision (IJCV), 127(3), 302-321.

Matei, B. C., & Sawhney, H. S., & Samarasekera, S., & Kim, J., & Kumar, R. (2008). Building Segmentation for Densely Built Urban Regions Using Aerial Lidar Data. Proceedings of the IEEE Conference on Computer Vision and Pattern Recognition (CVPR), (pp. 1-8).

Ulusoy, A. O., & Black, M. J., & Geiger, A. (2017). Semantic Multi-View Stereo: Jointly Estimating Objects and Voxels. Proceedings of the IEEE Conference on Computer Vision and Pattern Recognition (CVPR), (pp. 4531-4540).

Chen, X., & Ma, H., & Wan, J., & Li, B., & Xia, T. (2017). Multi-view 3D Object Detection Network for Autonomous Driving. Proceedings of the IEEE Conference on Computer Vision and Pattern Recognition (CVPR), (pp. 1907-1915).

Lee, J. K., & Yea, J., & Park, M. G., & Yoon, K. J. (2017). Joint Layout Estimation and Global Multi-view Registration for Indoor Reconstruction. Proceedings of the IEEE International Conference on Computer Vision (ICCV) (pp. 162-171).

\* cited by examiner

| Resolution | Approach | Point Classification Accuracy | ioU Ground | ioU Building | ioU Vegetation | ioU Clutter |
|---|---|---|---|---|---|---|
| 100cm | SRI Pipeline | 83.68% | 0.346 | 0.854 | 0.661 | 0.317 |
| 100cm | PointNet++ | 76% | 0.35 | 0.77 | 0.38 | 0.00 |
| 30cm | SRI Pipeline | 89% | 0.427 | 0.91 | 0.6410 | 0.378 |
| 30cm | PointNet++ | 83% | 0.38 | 0.82 | 0.00 | 0.00 |

| Resolution | Approach | Point Classification Accuracy | ioU Roof | ioU Facade | ioU Tree | ioU Bush | ioU Clutter | ioU Grass | ioU Street | ioU Sidewalk |
|---|---|---|---|---|---|---|---|---|---|---|
| 100cm | SRI Pipeline | 70.71% | 0.612 | 0.562 | 0.603 | 0.000 | 0.243 | 0.196 | 0.199 | 0.074 |
| 100cm | PointNet++ | 64.52% | 0.412 | 0.554 | 0.58 | 0.000 | 0.35 | 0.185 | 0.141 | 0.105 |
| 30cm | SRI Pipeline | 69.02% | 0.672 | 0.630 | 0.813 | 0.000 | 0.559 | 0.161 | 0.325 | 0.215 |
| 30cm | PointNet++ | 61.06% | 0.455 | 0.563 | 0.653 | 0.000 | 0.42 | 0.201 | 0.203 | 0.17 |

FIG. 4

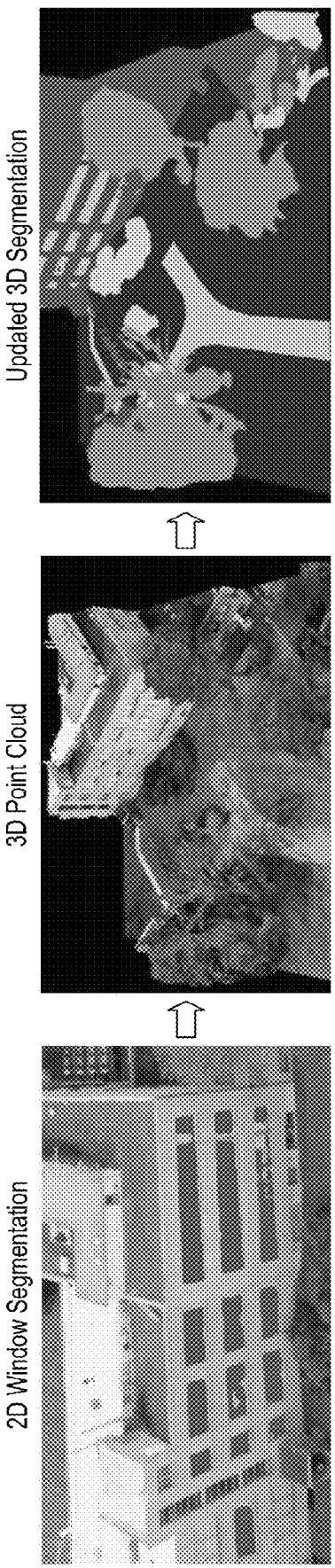

FULLY AUTOMATED MULTIMODAL SYSTEM ARCHITECTURE FOR SEMANTIC SEGMENTATION OF LARGE-SCALE 3D OUTDOOR POINT CLOUD DATA

CROSS-REFERENCE TO RELATED APPLICATIONS

This application claims benefit of and priority to U.S. Provisional Patent Application Ser. No. 63/078,444, filed Sep. 15, 2020, which is herein incorporated by reference in its entirety.

GOVERNMENT RIGHTS

This invention was made with government support under N00014-I 7-I-2949 awarded by the Department of the Navy, Office of Naval Research. The government has certain rights in the invention.

FIELD

Embodiments of the present principles generally relate to a method, apparatus and system for semantic segmentation of 3D data and, more particularly, to a method, apparatus and system for semantic segmentation of large-scale 3D, outdoor point cloud data.

BACKGROUND

Currently, 3D semantic segmentation is either manually performed, which is very costly, or automated using either deep neural networks or rule-based sequential algorithms. Deep neural networks are effective at extracting knowledge implicit in annotations, but yield results that are hard to explain, and hard to scale to very large scenes. Rule-based algorithms are more robust and explainable, but intractable beyond a certain complexity level. Furthermore, as large-scale 3D data becomes more ubiquitous, one of the bottlenecks in the use of such data is the sheer size and complexity. Having a reliable, fully automated segmentation system that can handle very large-scale scans would enable a number of downstream applications, such as mesh compression and 3D model alignment/pose estimation to be performed more intelligently, taking into account the semantic content of a given scene.

SUMMARY

Embodiments of methods, machine readable media and systems for semantic segmentation of 3D point cloud data are disclosed herein.

In some embodiments a method for semantic segmentation of 3D point cloud data includes determining ground data points of the 3D point cloud data, categorizing non-ground data points relative to a ground surface determined from the ground data points to determine legitimate non-ground data points, segmenting the determined legitimate non-ground and ground data points based on a set of common features, applying logical rules to a data structure of the features built on the segmented determined non-ground and ground data points based on their spatial relationships and incorporated within a machine learning system, and constructing a 3D semantics model from the application of the logical rules to the data structure.

An embodiment in accordance with the present principles includes a non-transitory machine-readable medium having stored thereon at least one program, the at least one program including instructions which, when executed by a processor, cause the processor to perform a method in a processor based system for semantic segmentation of 3D point cloud data, including determining ground data points of the 3D point cloud data, categorizing non-ground data points relative to a ground surface determined from the ground data points to determine legitimate non-ground data points, segmenting the determined legitimate non-ground and ground data points based on a set of common features, applying logical rules to a data structure of the features built on the segmented determined non-ground and ground data points based on their spatial relationships and incorporated within a machine learning system, and constructing a 3D semantics model from the application of the logical rules to the data structure.

In some embodiments, a system for semantic segmentation of 3D point cloud data includes a processor; and a memory coupled to the processor. In some embodiments the memory has stored therein at least one of programs or instructions executable by the processor to configure the system to determine ground data points of the 3D point cloud data, categorize non-ground data points relative to a ground surface determined from the ground data points to determine legitimate non-ground data points, segment the determined legitimate non-ground and ground data points based on a set of common features, apply logical rules to a data structure of the features built on the segmented determined non-ground and ground data points based on their spatial relationships and incorporated within a machine learning system, and construct a 3D semantics model from the application of the logical rules to the data structure.

In some embodiments in accordance with the present principles, a method, machine readable medium and system for semantic segmentation of 3D point cloud data includes determining non-ground data points of the 3D point cloud data, determining ground data points of the 3D point cloud data, normalizing the non-ground data points relative to a ground surface determined from the ground data points to determine legitimate non-ground data points, segmenting the legitimate non-ground and ground data points based on set of common features using a first machine learning process, applying at least one logical rule during a training process of the first machine learning process to guide the segmenting of the legitimate non-ground and ground data points, determining a data structure from the segmented legitimate non-ground and ground data points based on their spatial relationships using a second machine learning process, and constructing a 3D semantics model of the 3D point cloud data based on the determined data structure.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments. The patent or application file contains at least one drawing executed in color. Copies of this patent or patent application publication with color drawing(s) will be provided by the Office upon request and payment of the necessary fee.

FIG. 4 depicts a Table of quantitative evaluation results of the semantic 1008 segmentation system of FIG. 1 on level 1 of DublinCity benchmark data.

FIG. 6A depicts image-based window segmentation results of images determined using a semantic segmentation system in accordance with an embodiment of the present principles.

FIG. 6B depicts an example of a casting of image-based window segmentation results into a 3D semantics model in accordance with an embodiment of the present principles.

FIG. 6C depicts an example of the merging of the window segmentations cast into the 3D semantics model with other categories/classifications determined by a classification module of the semantic segmentation system of FIG. 1.

Figure 1:
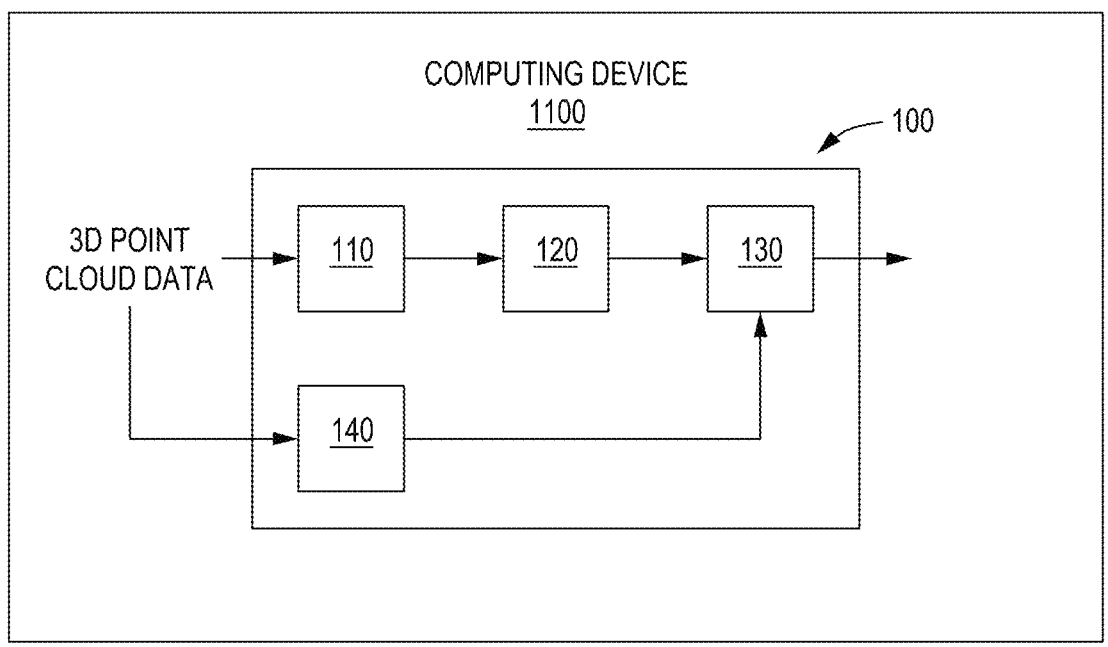
FIG. 1 depicts a high-level block diagram of a semantic segmentation system 100 in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for providing semantic segmentation of 3D point cloud data. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to specific 3D point cloud data and the application of specific machine learning processes, such teachings should not be considered limiting. Embodiments in accordance with the present principles can be applied to other similar data and other similar machine learning processes can be applied.

Embodiments of the present principles enable an understanding of distinct components of a large-scale scene, such as a 3D scene, and the contextual interactions between such components in order to obtain a better understanding of the scene contents and to enable a segmentation of the scene into various semantic categories of interest.

Embodiments of the present principles provide a novel, hybrid pipeline that combines the strengths of rules-based algorithm approaches and state-of-the-art deep neural networks in which machine learning components extract knowledge that is implicit in annotations, while the rule-based components provide added reliability, generalizability and predictability in behavior.

In at least some embodiments, a first step can include imbuing existing 3D models with such semantic attributes in the broader 3D scene understanding solution, enabling automatic identification of different objects, parts of objects or types of terrain, which in turn enables for such categories to be targeted separately by, for example, simulation frameworks, as well as various downstream processes. A second step can include comparing a determined data structure of the determined semantic attributes to logical rules (described in greater detail below).

In accordance with the present principles, the use of the semantic attributes, as determined in accordance with the present principles, makes it possible to at least: i) generate significantly more compact models without drastic degradations in quality and fidelity, enabling the deployment on mobile platforms that have limited computational capabilities, ii) improve localization accuracy when estimating the full six degrees of freedom (6-DOF) pose of a mobile agent situated in the scene, and iii) provide agents with richer and smoother interactions with, for example, 3D models during simulations and training scenarios.

Embodiments of the present principles automatically recover semantic attributes from 3D data using a deep neural network architecture, thus enabling the processing of large amounts of 3D points very quickly (millions of points per second). The disclosed embodiments require less training data by the implementation of first-order logic to incorporate common-sense rules. Embodiments of the present principles enable numerous applications in areas such as: autonomous navigation (including self-driving), geo-localization, 3D semantic modeling for urban planning and situational awareness, scene understanding for outdoors and indoors, data compression and the like.

FIG. 1 depicts a high-level block diagram of a semantic segmentation system 100 in accordance with an embodiment of the present principles. As depicted in FIG. 1, embodiments of a semantic segmentation system of the present principles, such as the semantic segmentation system 100 of FIG. 1, can be implemented in a computing device 1100 (described in greater detail below). The semantic segmentation system 100 of FIG. 1 illustratively comprises a pre-processing module 110, a ground extraction module 120, a classification module 130 and a rules module 140.

Although in the embodiment of the semantic segmentation system 100 of FIG. 1, the semantic segmentation system comprises a pre-processing module 110 and a ground extraction module 120, in some embodiments of the present principles information and data points regarding ground and non-ground data points and information regarding logical rules can be provided to a classification module 130 of the present principles and in such embodiments a pre-processing module 110, a ground extraction module 120 and a rules module 140 would be optional in a semantic segmentation system of the present principles. That is, in such embodiments, the capabilities of a classification module 130 of the present principles and as described herein can be provided as a stand-alone system application to determine semantic segmentation in accordance with the present principles.

Figure 2:
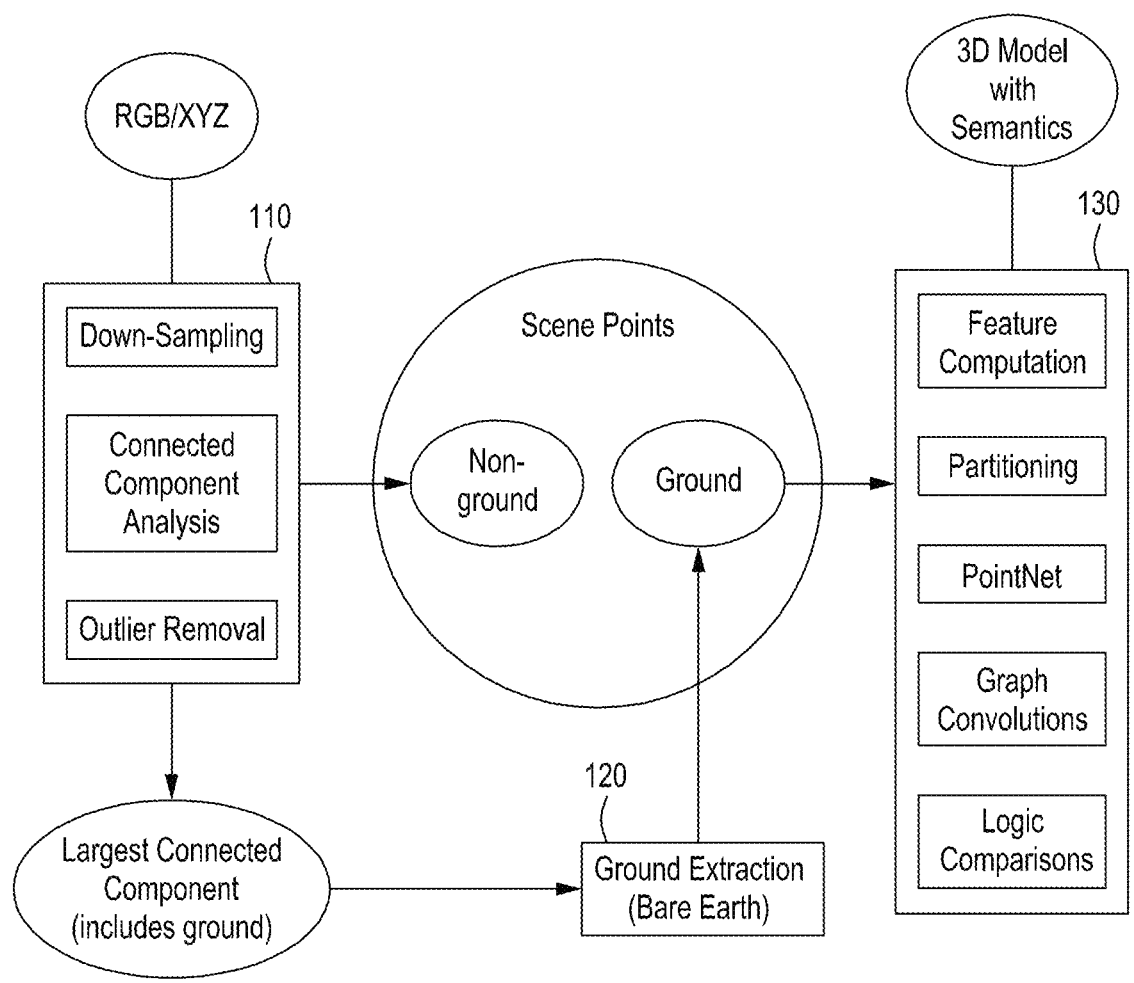
FIG. 2 depicts a functional block diagram of the operation of a segmentation portion of the semantic segmentation system of FIG. 1 in accordance with an embodiment of the present principles.

FIG. 2 depicts a functional block diagram of the operation of the semantic segmentation system 100 of FIG. 1 in accordance with an embodiment of the present principles. As depicted in the embodiment of FIG. 2, in the semantic segmentation system 100 of FIG. 1, point cloud data can be input to the pre-processing module 110. In the pre-processing module 110, the input point cloud is down-sampled to a spatially uniform resolution by computing a voxel grid, which is then used to perform a 26-connected component analysis on the raw point cloud. In some embodiments, the resulting connected components are ordered from largest to smallest according to the number of points contained, and the largest "n" connected components are fused into "scene points" where "n" is selected such that scene points cover a sufficiently large portion of the raw input. The goal is not to capture the entirety of non-outlier points, but rather to obtain a sufficiently large yet incomplete subset of the input scene that is devoid of any outlier points. A ground estimation algorithm can then be run on the scene points without being derailed by the outliers. Once a reliable estimate for the ground level is obtained by the pre-processing module 110, all the disconnected components above ground are added back, while the below-ground patches are discarded.

A purpose of the pre-processing module 110 is to increase a robustness of a semantic segmentation system of the present principles, such as the semantic segmentation system 100 of FIG. 1, to operate in the presence of outlier points that can be, for example, low-confidence LIDAR measurements or artifacts from a photogrammetry algorithm. The presence of significant outlier points adversely affects the accuracy of ground level estimation, as well as distorting the geometry and context surrounding objects or areas of interest, making it harder for semantic segmentation system of the present principles, such as the semantic segmentation system 100 of FIG. 1, to infer the correct semantic labels.

As depicted in FIG. 2, the largest connected components, which includes ground, determined by the pre-processing module 110, is communicated to the ground extraction module 120. In some embodiments, the ground extraction approach of the present principles is, at its core, a rule-based binary ground vs. non ground classifier algorithm with robust interpolation capabilities that produces binary labels as well as a Digital Elevation Model (DEM) representation of the terrain. In some embodiments, the ground extraction module 120 grows patches of 3D points from a number of seed points that have locally minimum altitudes. In some embodiments the ground extraction module 120 can produce a Digital Surface Model (DSM) from upper level 3D data, for example, collected from the air. The resulting region-growing takes into account smoothness of local point neighborhoods. The disjoint patches are eventually merged and filled to create the ground surface layer. Aside from enabling below-ground outliers to be targeted and discarded, the extracted ground serves as a valuable frame of reference for all other objects present in the scene, establishing a useful coordinate system and enabling the use of height-above-ground-elevation values and provides excellent performance in rapidly changing terrain conditions such as hills, mountains and vineyards. In the ground extraction module 120, the non-ground data points determined by the pre-processing module 110 can be categorized relative to the ground surface layer to determine legitimate non-ground data points. That is, in accordance with embodiments of the present principles, non-ground data points are bound to a relative ground surface layer determined for respective 3D point cloud data instead of having a global ground surface layer for all images.

As depicted in FIG. 2, the non-ground information (scenes) and the ground information (scenes) determined by the pre-processing module 110 and the ground extraction module 120 are communicated to the classification module 130. In the embodiment of FIG. 2, the classification module 130 can perform at least one or multiple feature computation processes 202, partitioning processes 204, PointNet processes 206, graph convolutions processes 208 and logical comparisons processes 210 on the non-ground information and the ground information to determine semantic segmentation in accordance with the present principles. For example, in some embodiments, the feature computation process 202 of the classification module 130 can implement machine learning processes to perform feature extraction of the non-ground data and the ground data. In some embodiments, the partitioning processes 204 of the classification module 130 can include segmenting data points according to common properties, such as geometric properties (e.g., shape and appearance), color properties, temporal relationships, and the like. In some embodiments, data points are segmented into more detailed classes based on a class of the data points using a classification algorithm (described in greater detail below). For example, in some embodiments, an algorithm is applied to segment data into clusters (super-points). In some embodiments, the algorithm can further be applied to learn piecewise constant functions to determine a data structure for the data, such as weighted graphs. In such embodiments, a graph convolutions process 208 can be applied to implement neural networks to learn features from neighboring cells.

In some embodiments of the present principles, the classification module 130 can apply a Pointnet neural network 206 to further perform object classification, part segmentation, to scene semantic parsing of the data points (described in greater detail below).

In accordance with the present principles, classification of the present principles, at least as described herein, can be refined using the knowledge of the determined ground. That is, the non-ground data points determined by the pre-processing module 110 can be categorized relative to the ground surface layer. For example, in some embodiments information regarding the determined ground can be used to inform algorithms for structure characterization. As such, information regarding the determined ground location can be implemented in classifying above-ground structures. The above-described classification module 130 of the present principles implements a deep-learning pipeline that can be used to detail classification for 3D point clouds using 3D and other imagery.

In some embodiments, the logical comparisons processes 210 of the classification module 130 can include applying rules or constraints to the determined classification as declarative, first-order logic statements to guide the training of the semantic segmentation of the present principles (described in greater detail below).

The processes of the classification module 130 in accordance with some embodiments of the present principles are described in further detail below. As described above, in some embodiments, at the classification module 130 the determined 3D data is grouped into, for example, superpoints. More specifically, the idea of superpoints is analogous to superpixels and are local groupings of 3D points that are homogenous in terms of a set of desired properties. In some embodiments, the 3D point data is grouped by the classification module in accordance with a set of local geometric features expressed in terms of eigenvalues of point distributions, as well as appearance features like color and texture. By formulating the point classification problem at the level of superpoints rather than individual points in accordance with embodiments of the present principles, the computational complexity and the size of the required training data is reduced drastically without impacting the performance, assuming that the superpoint partitioning is such that all the points in a given superpoint belong to one semantic category only. In some embodiments, once the features of interest are computed for each point, the superpoint partitioning is performed using, for example, a cut-pursuit optimizer, which can include fast algorithms used to learn piecewise constant functions to determine a data structure for the data, such as weighted graphs.

In some embodiments, a regularization strength parameter determines how aggressive the grouping will be in any instance, and such a regularization strength parameter is empirically selected for each sensor type. Using the determined superpoint partitions, in some embodiments a Delaunay triangulation of the complete 3D input point cloud can be computed, resulting in a Voronoi diagram that dictates a graph topology on the superpoints, in which graph edges indicate a shared boundary between at least a single pair of points across two different superpoints. These edges can be further weighted by "edge features" which are computed from the complete set of three-dimensional offsets between neighboring points across two different superpoints. The determined graph becomes the intermediate representation for the input scene, where each node is a superpoint.

Figure 3A:
FIG. 3A depicts a point cloud image, which can be an exemplary input to the pre-processing module of the semantic segmentation system of FIG. 1.
Figure 3B:
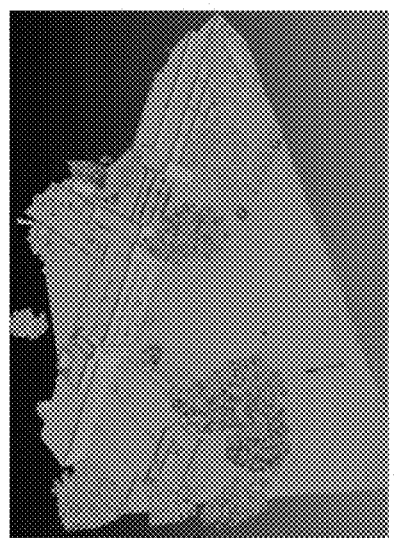
FIG. 3B depicts color-coded local geometric features of the input point cloud of FIG. 3A, representative of the output of the pre-processing module and the ground extraction module of the semantic segmentation system of FIG. 1.
Figure 3C:
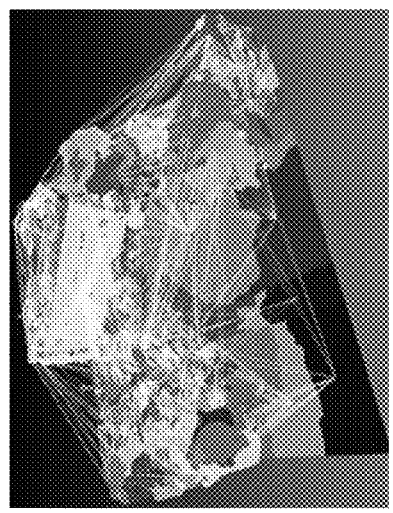
FIG. 3C depicts resulting superpoints and a neighborhood graph as determined by and output from the classification module of the semantic segmentation system of FIG. 1.

FIG. 3A depicts a point cloud image with RGB, which can be an exemplary input to the pre-processing module 110 of the semantic segmentation system 100 of FIG. 1. FIG. 3B depicts color-coded local geometric features of the input point cloud of FIG. 3A, which can be representative of the output of the pre-processing module 110 and the ground extraction module 120 of the semantic segmentation system 100 of FIG. 1. FIG. 3C depicts resulting superpoints and the neighborhood graph as can be determined by and output from the classification module 130 of the semantic segmentation system 100 of FIG. 1. Defining neighborhoods in accordance with embodiments of the present principles and as described above instead of by proximity enables very long-range interactions between different regions if the space between them is empty. This is a very compact and very powerful representation for effectively taking into account context during segmentation.

The inventors note that graphs are among the most general data types to effectively represent entities and their relationships, and that therefore graphs lend themselves naturally to the problem of modeling context in the classification module 130 of the semantic segmentation system 100 of FIG. 1. In addition, graphs enable a functional combination of relational structures known or computed a priori, with the end-to-end learning power of neural networks. In some embodiments, in the context of deep learning, graph representations fully generalize the specific connectivity of structures of other standard networks such as convolutional networks (CNNs) which are fully-connected special-case graphs, and recurrent neural networks (RNNs) which have a chain graph structure. In the graph neural network paradigm applied in some embodiments of the present principles, the standard neural network operations, such as convolutions and pooling, can be replaced by a 4-step operation over the internal states of each graph node, as well as the graph itself, as follows:

i) Message passing: Each edge in the graph carries a message from a sender node to a receiving node. If the graph is not directional, such as the graph-based representations of outdoor scenes used in a semantic segmentation system of the present principles, such as the semantic segmentation system 100 of FIG. 1, the messages are passed over each edge bidirectionally.

ii) Edge update: Edge features are updated with respect to each receiver node, according to the message carried.

iii) Node update: Updated edge features for each receiver node are aggregated, updating the internal state of the node.

iv) Global update: Global attributes of the graph are updated, if any.

As applied in embodiments of the present principles, edge weights are features that characterize the geometric properties of each node, i.e. superpoints, relative to its Voronoi neighbors. In some embodiments, the segmentation system of the present principles employs both handcrafted features together with a deep learning pipeline for semantic segmentation which attaches a class label to every point. Handcrafted features are used to create a coarse segmentation into ground, building and clutter classes. The features are refined subsequently. The ground segmentation is used to aid in getting additional features in terms of height above the ground that can be fed in the deep-learning pipeline of the present principles. The initial assignment can be erroneous, which means that areas that are preliminary labeled as ground could be reclassified later at a later time in the segmentation process. The deep learning classification leverages a point partitioning into clusters of data that have common/similar features according to, for example, local shape and appearance/color when this is available. Next, for each such point an embedding and a spatial partitioning are computed in which superpoints are nodes in a graph and edges are relationships between the nodes based on vicinity or other characteristics. In some embodiments, a graph neural network can be used to perform a final classification for the features. A graph neural network learns the context and will have better results for smaller objects that can be ambiguous on their own but they can be resolved in terms of class assignment based on the surrounding/neighboring classes. The output of the classification module of the present principles, such as the classification module 130, is a refined classification with additional classes when afforded by the density of the points and the presence of color attributes.

In some embodiments of the present principles, a latent vector that stores the internal state of each node prior to any message passing is generated by ingesting each superpoint patch into a PointNet architecture without the Spatial Transformer Network component. That is, in some embodiments PointNet architecture is used in lieu of local geometric features, and the graph convolutions with the edge weights bring in global context.

FIG. 4 depicts a partitioned Table of quantitative evaluation results of the semantic segmentation system 100 of FIG. 1 on level 1 of DublinCity benchmark data. DublinCity is a novel benchmark dataset that includes a manually annotated point cloud for over 260 million laser scanning points into 100,000 (approx.) assets from Dublin LiDAR point cloud in 2015. Objects are labelled into 13 classes using hierarchical levels of detail from large (i.e., building, vegetation and ground) to refined (i.e., window, door and tree) elements. More specifically, the Table of FIG. 4 depict a comparison of the semantic segmentation of the present principles, annotated in FIG. 4 as "SRI's pipeline", with PointNet++, a deep neural network architecture that is in widespread use. The comparison of FIG. 4 is done over two standard metrics: i) Point classification accuracy, which is the percentage of 3D points that are correctly classified by a given segmentation system, and ii) Intersection-over-union, which measures how well a segmentation result overlaps with the ground truth. Intersection over union metrics are between 0-1 and therefore can be seen as percentages, and are reported separately for each of a plurality of semantic classes. These quantitative results were generated on DublinCity benchmark at two different levels of semantic classification. As can be seen clearly from FIG. 4, SRI's pipeline has better accuracy metrics for both levels and resolutions. Furthermore, intersection-over-union numbers are overwhelmingly better for SRI's pipeline for most classes.

While 3D data is typically richer in information content, image data that is aligned to a 3D reference is not redundant—certain features are simply easier to detect on images, such as building facades and windows, which are mostly planar structures that lack geometric detail and therefore must be detected using color, texture or other forms of appearance. While 3D point clouds can also contain these attributes, the density and connectivity structures of image pixels make them better suited to find these types of objects. The problem is that these image-based segmentations will then need to be mapped onto the 3D model efficiently. As such, in some embodiments, state-of-the-art deep neural networks are implemented for image-based detection and segmentation, together with an efficient raycasting approach to transfer the results back into 3D.

In a classification module of the present principles, such as the classification module 130 of the semantic segmentation system 100 of FIG. 1, the inventors experimented with two different structures—building facades and windows. In one embodiment, for building facades, a modified version of RetinaNet was used, which is a network that is very similar to Region-based Convolutional Neural Networks (R-CNNs) in that it utilizes a two-stage detection process; a first stage computing the anchor locations and aspect ratios while the second stage regresses to find offsets from these anchors to final detections. Instead of using a bounding box representation, the second stage regresses boxes into general quadrilaterals instead. The general quadrilateral representation enables very tight bounds on building facades and can be trained on as little as a few hundred annotated images before it can learn to reliably find rectangular building facades.

Because building windows are much smaller features, the inventors determined that trying to fit quads accurately around each window does not work as reliably as doing pixel-based segmentation to find them. To this end, in some embodiments, the inventors use a state-of-the-art variant of UNet architecture, namely Unified Perceptual Parsing Network. This hierarchical network design uses features at various semantic levels and identifies compositional structures, i.e. objects and their parts, among detected concepts. In one embodiment, the semantic segmentation system of the present principles was trained on ADE20K, which is a large image segmentation dataset and benchmark.

Figures 5A, 5B:
FIG. 5A depicts aerial images of a local work campus on which the semantic segmentation system can be applied in accordance with an embodiment of the present principles.
FIG. 5B depicts image-based window segmentations determined using the semantic segmentation system of FIG. 1 in accordance with an embodiment of the present principles.

The inventors tested the semantic segmentation system 100 of the present principles on aerial images of a work campus in Princeton New Jersey. FIG. 5a depicts aerial images of a local work campus in Princeton, New Jersey on which the semantic segmentation system 100 can be applied in accordance with an embodiment of the present principles. FIG. 5b depicts image-based window segmentations determined using the semantic segmentation system of the present principles, such as the semantic segmentation system 100 of FIG. 1. In FIG. 5b, window pixels are marked in red. As depicted in FIG. 5b, most all instances of windows from FIG. 5a are detected accurately in red in FIG. 5b by the semantic segmentation system 100 of FIG. 1.

In some embodiments, the image-based detection and segmentation results described above are transferred back into the 3D model through an efficient ray-casting algorithm that casts a ray from each pixel into the point cloud to attempt to find the 3D points corresponding to the detections or segmentations on the image. Since the points can be infinitesimally small, the ray is likely to pass through the point cloud without hitting any actual points. Therefore, in some embodiments the points can be represented with spheres of varying radius with which these rays could potentially intersect. It is also true that a given ray can pass through multiple such spheres, so an intersecting point that is closest to the camera can be selected, which is a form of straightforward occlusion reasoning. Because raycasting can be a relatively expensive procedure, in some embodiments, an octree structure is computed on the point cloud, and the octree structure is used to first find which cells intersect with a set of rays. Subsequently, inside each cell, a finer-detail intersection is processed to find which exact points are hit inside a given cell. The radius of the sphere that is going to represent each point needs to be selected in a manner that takes into account least a: i) density of the point cloud, so that neighboring spheres don't actually intersect with each other, but also don't have large gaps between them, ii)

perspective foreshortening, because the points closer to the camera should be represented with smaller spheres than those that are far, and iii) resolution of the camera image, since that determines how large a frustum each ray represents.

For example, FIGS. 6a-6c depict an example of segmentation results of a semantic segmentation system of the present principles, such as the semantic segmentation system 100 of FIG. 1, in which window detections, determined as described above, are merged from image-based segmentations using the above described raycasting approach, with other categories inferred from 3D in accordance with an embodiment of the present principles. More specifically, FIG. 6a depicts image-based window segmentation results of images as determined by a semantic segmentation system in accordance with an embodiment of the present principles. As depicted in FIG. 6B, the image-based window segmentation results are cast into the 3D semantics model in accordance with an embodiment of the present principles. In accordance with embodiments of the present principles and as depicted in FIG. 6C, the window segmentations cast into the 3D semantics model are merged with other categories/ classifications determined, as described above, by a classification module of the present principles, such as the classification module 130 of the semantic segmentation system 100 of FIG. 1.

In the embodiment of the semantic segmentation system 100 of FIG. 1, the rules module 140 implements a rules-based approach of the present principles. That is, in accordance with the present principles, groundings are implemented by the rules module 140 of the semantic segmentation system 100 of FIG. 1 to map logical binaries to $(-\infty, \infty)$ range. That is, one of the most fundamental shortcomings with deep neural networks is their lack of basic reasoning capabilities, which sometimes causes them to make trivial mistakes that either violate some common-sense facts or yield results that are hard to explain or inconsistent with respect to some external constraints that are not captured by the supervision. When annotations are abundantly available, this kind of logical reasoning is not as necessary, but for relatively rare and/or small object categories, it is more crucial. Most existing approaches integrate such logical constraints into their pipeline either by post-processing inference results, or by adding additional feature channels to bring out desired properties manually.

Instead, in accordance with embodiments of the present principles, such domain knowledge is embedded directly inside the training process of all related deep networks, so that they softly constrain/guide the knowledge implicit in the supervision, rather than directly modifying inference results, or trying to capture some of the domain knowledge in the feature layers. This idea necessitates the logical constraints, which are normally thought of as operations on binary values, to be expressed in a continuous domain so as to allow for gradient backpropagation through the logical operators during training. This is the key idea that enables tightly integrating any rule or constraint into deep neural networks, as long as they can be expressed using standard first-order logic. Such continuous-domain versions of logical operators are referred to as "groundings" for first-order logic, and the choice of a good set of groundings is crucial in avoiding numerical instabilities as well as other common problems like vanishing gradients that become more pronounced as the gradients have to flow through more and more layers.

In embodiments of the present principles, a rule set or specific domain knowledge are integrated by applying the rules or constraints as declarative, first-order logic statements, in some embodiments, making use of the 7 standard operators: and, or, not, equals, implies, for all, there exists. In one embodiment, SRI's DASL system can be implemented to apply logical rules. SRI's DASL system is described in commonly owned patent application Ser. No. 16/611,177 filed on Nov. 5, 2019, which is incorporated herein by reference in its entirety.

Figure 7:
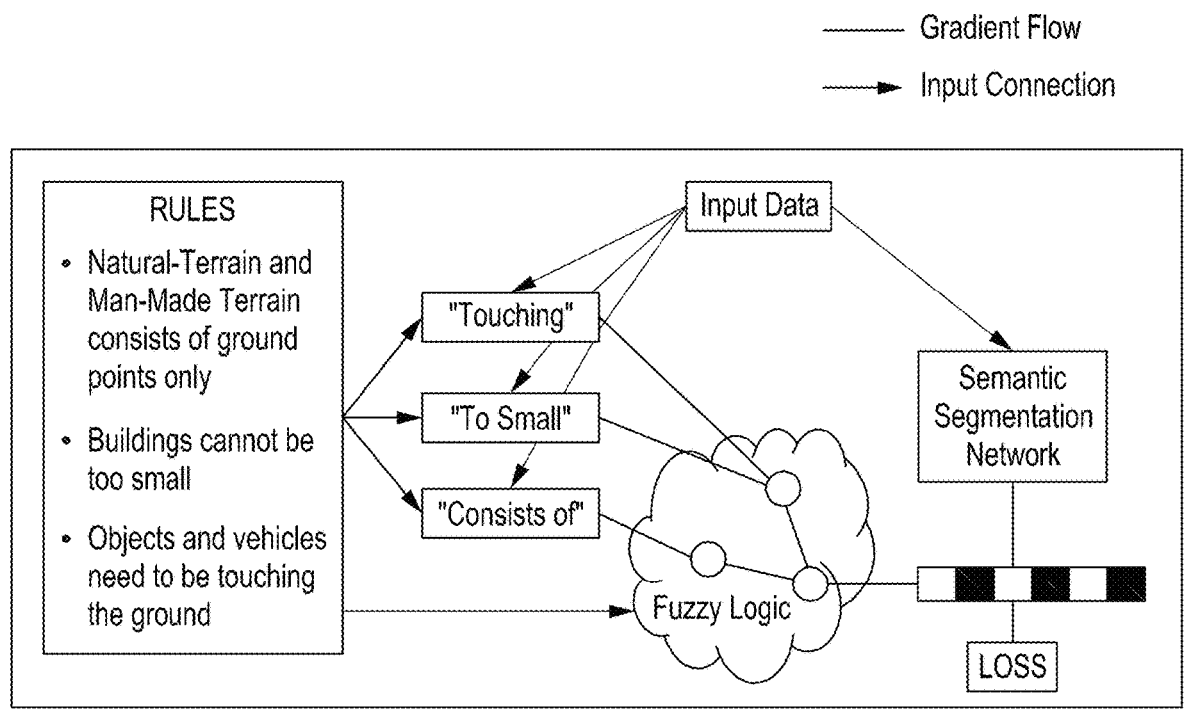
FIG. 7 depicts a functional diagram of the application of a rules set by, for example, a rules module of the semantic segmentation system of FIG. 1 and how the rules interact with a deep neural network in accordance with an embodiment of the present principles.

For example, FIG. 7 depicts a functional diagram of the application of a rules set by, for example, the rules module 140 of the semantic segmentation system 100 of FIG. 1 and how the rules interact with a deep neural network in accordance with an embodiment of the present principles. In FIG. 7, the orange boxes represent function implementations corresponding to the phrases they represent, and the blue nodes represent continuous-domain logical operators. Together they form the grammar for a given problem. In FIG. 7, gradients flow through the red connections and fuzzy logic can be applied to the continuous-domain logical operators. These processes can either be straightforward functions or other neural networks in their own right. In any event, gradients will flow through them so that the logical constraints can be made a part of the training process. When the rules are expressed in terms of these functions and first-order logic operators, the expressions imply a certain set of logical connections between the segmentation network and the rule grammar. This entire structure is connected to the latent vector that is used to infer semantic labels, constraining/ guiding the form it can take, thereby constraining the latent space during training according the rule constraints. This entire construct allows the system to correct for basic common-sense mistakes, while also making the results of the system more explainable to a human agent.

In the example of FIG. 7, outdoor scenes and computational equivalents to certain semantic phrases such as "consists of", "touching" and "too small" can be stored for example in the rules module 140. In other embodiments, rules can be communicated to the rules module 140 by a user. In the embodiment of FIG. 7, the rules in the rules module 140 include that "Natural-Terrain and Man-Made Terrain consists of ground points only", that "Buildings cannot be too small", and that "Objects and vehicles need to be touching the ground". 3D point cloud data that do not comply with the logical rules can be discarded.

As further depicted in FIG. 7, in accordance with embodiments of the present principles, a loss function can be determined, for example on a frame by frame basis, for segmented and categorized data that have corresponding 3D point cloud data that complied with the logical rules to determine if the categorized and segmented data points determined by a semantic segmentation system of the present principles, such as the semantic segmentation system 100 of FIG. 1, comply with the logical rules to guide the semantic segmentation of the present principles as described above.

In some embodiments, a 3D point cloud model can be determined from the categorized and segmented 3D point cloud data that comply with the logical rules. In some embodiments, the determined 3D model can include layers of segmented and categorized point cloud data as described herein.

In accordance with the present principles, in some embodiments meshification/dense surface reconstruction can be applied to the semantic attributes determined/inferred by a semantic segmentation system of the present principles, such as the semantic segmentation system 100 of FIG. 1 for the effective compression of such dense models. More specifically, the semantic attributes inferred by a semantic segmentation system of the present principles enable different classes of objects to be targeted by modeling approaches in a way that is uniquely tailored to that object class. For instance, using the knowledge that buildings are mostly rectilinear with sharp boundaries, edges and corners, areas segmented with the "building" label can be processed with an algorithm that can safely make those assumptions. On the other hand, ground layer can be effectively represented in 2.5D, using a coarser resolution. This means that different parts of the same scene can be represented at different resolutions and level-of-detail, making optimal use of computational resources as well as enabling a transfer of bandwidths and storage space. By making the meshing/surface reconstruction process aware of semantics in accordance with the present principles, enables the ability to produce more compact and lightweight models that can easily be loaded onto mobile platforms, while preserving distinct and salient features for each category when simplified.

Figures 8A, 8B:
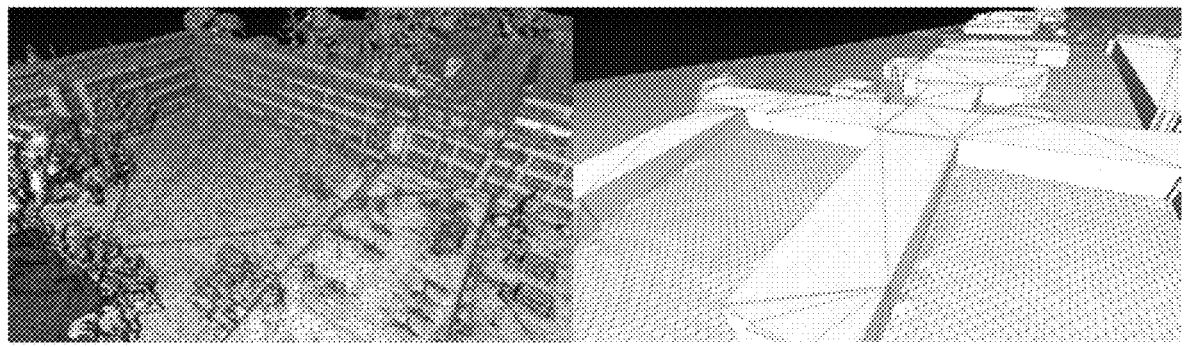
FIG. 8A depicts a full mesh result of a semantic segmentation of 3D point image data of a semantic segmentation system of the present principles.
FIG. 8B depicts the result of a semantics-aware mesh compression algorithm having been applied to the segmented 3D point image data of FIG. 8A in accordance with an embodiment of the present principles.

For example, FIG. 8A and FIG. 8B depict an example of mesh compression in accordance with an embodiment of the present principles. Specifically, FIG. 8A depicts a full mesh result of the semantic segmentation of 3D point image data of a semantic segmentation system of the present principles, such as the semantic segmentation system 100 of FIG. 1. FIG. 8B depicts the result of a semantics-aware mesh compression algorithm having been applied to the segmented 3D point image data of FIG. 8A. That is, as depicted in FIG. 8B, the semantics-aware mesh compression algorithm compactly models ground and building and throws out the remaining categories. In FIG. 8B, a low-resolution 2.5D representation is used for ground and a rectilinear polygonization approach is used to model buildings at a higher resolution, and remove all other object categories from the meshification process. The original mesh of FIG. 8A contains 8,260,198 vertices and 16,321,204 faces in 1.25 GB file size, while the compressed mesh of FIG. 8B contains 83,338 vertices and 161,305 faces in 16.2 MB. In accordance with other embodiments of the present principles, the remaining classes can also be removed or added to the simplified mesh at their original resolutions, or as other simplified versions generated by standard, general-purpose mesh simplification algorithms.

In accordance with the present principles, the determination of semantic classifications in accordance with the present principles, also enables or varying levels of detail for each category independent of other categories. For example, in some embodiments a segmentation system of the present principles can include a resolution of 2.5D ground, which is progressively changed from 2 m to 10 m resolution over several images/models while keeping a resolution of the buildings constant.

Geo-registration refers to the solution of locating an agent in a larger-scale map of its surroundings, using information regarding the local data that is captured by the agent's sensors. A variety of data modalities can be used as the reference map, including satellite or aerial imagery, but 3D models provide much richer information and therefore are better suited for the task when they are available. Often, the exact geographic location of such reference maps are known in advance, which in turn enables for the accurate localization of the agent on a world map. Such an automatic localization capability is a powerful tool in the context of autonomous self-navigating robotic agents as well as AR/VR training and simulation scenarios in which a human agent needs to be accurately placed inside particular scene over long periods of time.

Figure 9A:
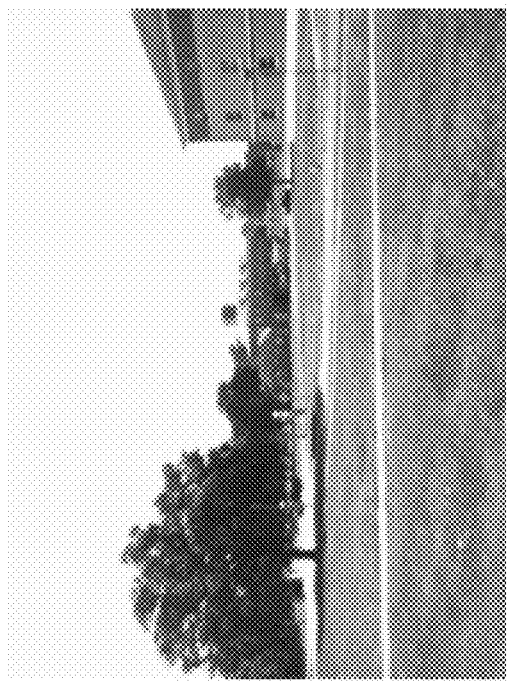
FIG. 9A depicts an image of a LIDAR video frame.
Figure 9B:
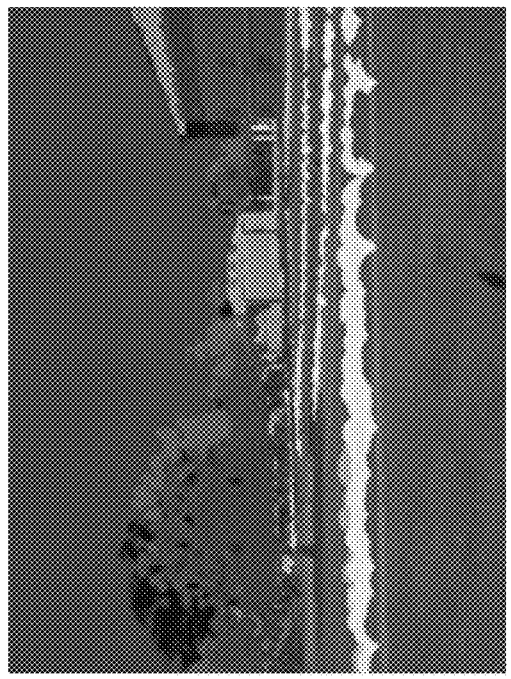
FIG. 9B depicts an image of the LIDAR video frame of FIG. 9A overlayed on top of a 3D semantic reference layer.
Figure 9C:
FIG. 9C depicts a resulting segmented semantic layer of the LIDAR video frame as determined by a semantic segmentation system of the present principles.
Figure 9D:
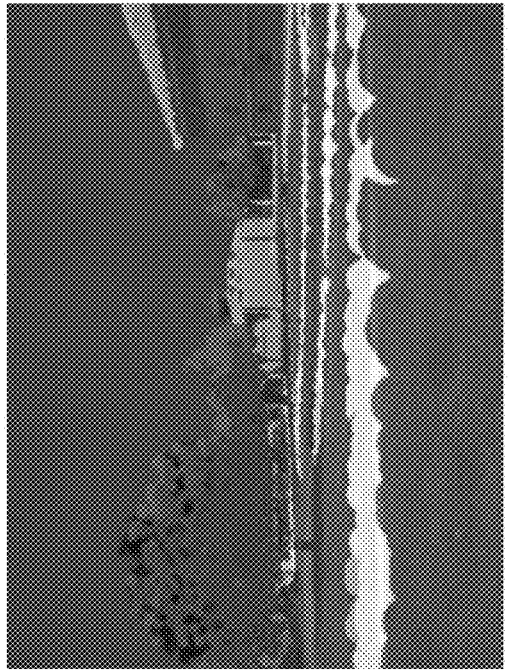
FIG. 9D depicts an image of an improved alignment between the LIDAR video frame of FIG. 9A and the 3D semantic reference layer when a segmented semantic layer determined in accordance with embodiments of the present principles is applied.

In some embodiments, by providing semantic understanding, in accordance with the present principles, to both a reference 3D model and to local 2D images captured by an agent moving through a scene, it is possible to considerably improve the full 6-DOF pose estimation accuracy for the agent, resulting in a more accurate motion trajectory that can be computed automatically. For example, FIGS. 9A-0D depict an experiment in which the 3D point data includes an aerial LIDAR capture and an agent is recording a video feed as it is traversing the scene. In the experiment of FIGS. 9A-9D, a semantic segmentation system of the present principles, such as the semantic segmentation system 100 of FIG. 1, is used to compute the semantics in the 3D model, and a standard image-based segmentation algorithm is used to compute the same semantic categories on each frame provided by the agent's video feed. The 6-DOF pose are computed of the agent's camera with and without the use of the semantic categories, and the results are compared by using the estimated pose to render the 3D model from the viewpoint of the agent's camera. In FIGS. 9A-9D, an input video frame, 9A, is overlayed on top of the 3D semantic reference layer, 9B, using the pose estimate obtained from image alone. When the semantic layer for the input image, 9C, is also used in the alignment process, the frame is better aligned with the 3D reference as depicted in FIG. 9D. It can be seen that a significant improvement in the localization accuracy is obtained, even when relatively few semantic categories are used.

Figure 10:
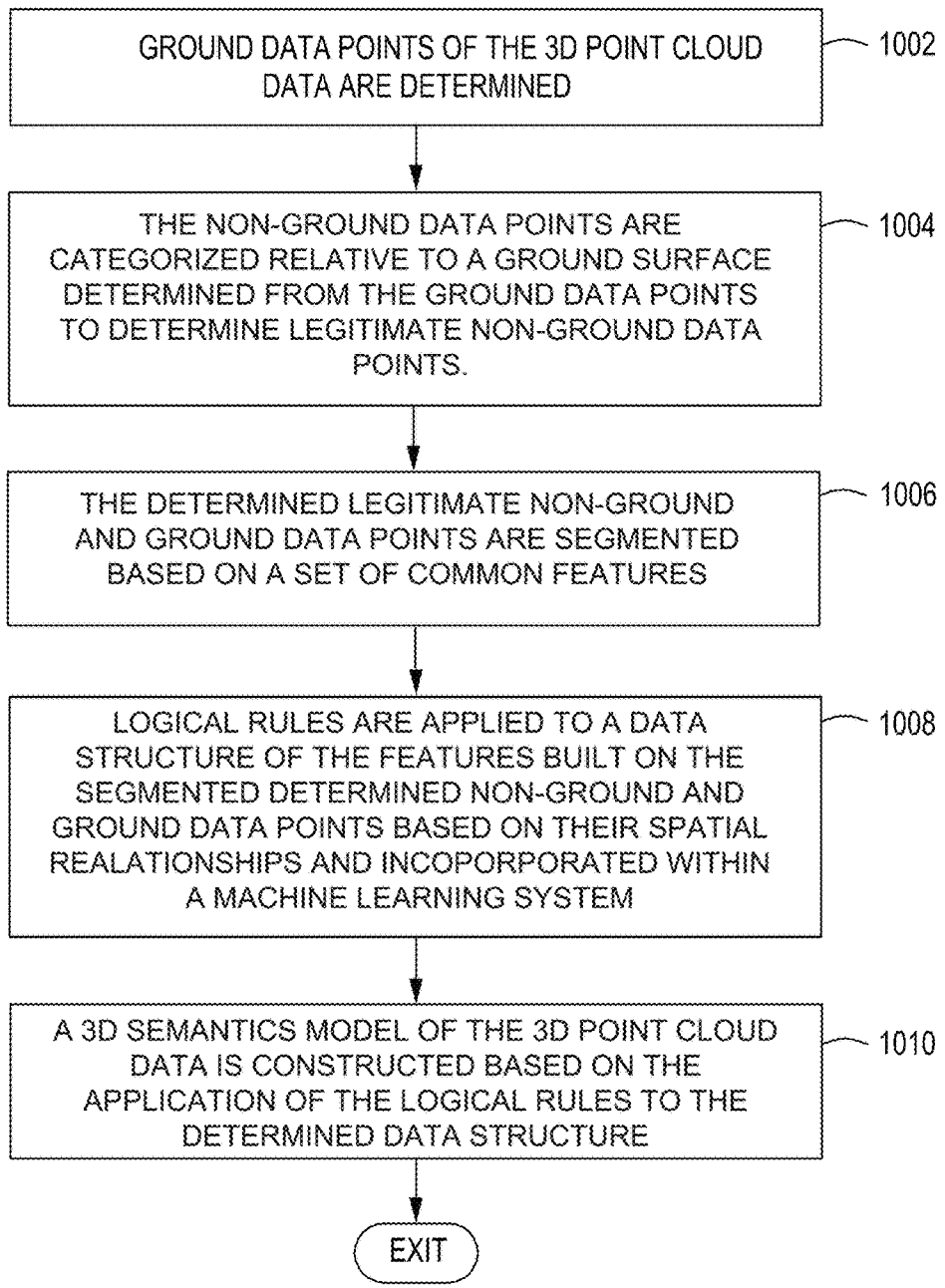
FIG. 10 depicts a flow diagram of a method for semantic segmentation of 3D point cloud data in accordance with an embodiment of the present principles.

FIG. 10 depicts a flow diagram of a method 1000 for semantic segmentation of 3D point cloud data in accordance with an embodiment of the present principles. The method 1000 can begin at 1002 during which ground data points of the 3D point cloud data are determined. For example, in one embodiment and as described above, in a ground extraction module of the present principles, the ground extraction approach includes a rule-based binary ground vs. non ground classifier algorithm with robust interpolation capabilities that produces binary labels as well as a DEM representation of the terrain. In some embodiments, the ground extraction module 120 grows patches of 3D points from a number of seed points that have locally minimum altitudes, which takes into account smoothness of local point neighborhoods and in which disjoint patches are eventually merged and filled to create the ground layer. The method 1000 can proceed to 1004.

At 1004, non-ground data points are categorized relative to a ground surface determined from the ground data points to determine legitimate non-ground data points. For example, in one embodiment and as described above, at the ground extraction module 120, non-ground data points can be categorized relative to the ground surface layer to determine legitimate non-ground data points. The method 1000 can proceed to 1006.

At 1006, the legitimate non-ground and ground data points are segmented based on set of common features in one example using a first machine learning process. For example, in one embodiment and as described above, at the classification module 130 the 3D data is grouped into, for example, superpoints, which are analogous to superpixels and are local groupings of 3D points that are homogenous in terms of a set of desired properties. Such superpixels can be implemented to categorize and segment the 3D point data as described above. The method 1000 can proceed to 1008.

At 1008, logical rules are applied to a data structure of the features built on the segmented determined non-ground and ground data points based on their spatial relationships and incorporated within a machine learning system. For example, in one embodiment and as described above, a graph topology can be determined on the superpoints and a determined graph becomes the intermediate representation for the input scene, where each node is a superpoint. Logical rules or constraints can then be applied to the determined data structure as declarative, first-order logic statements The method 1000 can proceed to 1010.

At 1010, a 3D semantics model of the 3D point cloud data is constructed based on the application of the logical rules to the determined data structure. For example, in one embodiment and as described above, a rule set or specific domain knowledge are integrated by applying the rules or constraints as declarative, first-order logic statements, in some embodiments, making use of the 7 standard operators: and, or, not, equals, implies, for all, there exists. The entire structure can be connected to the latent vector that is used to infer semantic labels, constraining the form it can take, thereby constraining the latent space during training according the rule constraints enabling a system of the present principles to correct for basic common-sense mistakes, while also making the results of the system more explainable to a human agent. In some embodiments, 3D point cloud data points that do not comply with the logical rules can be discarded. The method 1000 can then be exited.

In some embodiments, the method 1000 can further include a pre-processing step 1001 during which, non-ground data points of the 3D point cloud data are determined. For example, in one embodiment and as described above, in the pre-processing module 110, the input point cloud can be down-sampled to a spatially uniform resolution, a 26-connected component analysis on the raw point cloud can be performed, and the resulting connected components can be ordered from largest to smallest according to the number of points contained, and the largest "n" connected components are fused into "scene points" to obtain a sufficiently large yet incomplete subset of the input scene that is devoid of any outlier points. The method 1000 can proceed to 1004.

As depicted in FIG. 1, embodiments of a semantic segmentation system of the present principles, such as the semantic segmentation system 100 of FIG. 1, can be implemented in a computing device 1100 in accordance with the present principles. That is, in some embodiments, 3D point cloud data and the like can be communicated to, for example, the pre-processing module 110 and the rules module 140 of the semantic segmentation system 100 using the computing device 1100 via, for example, any input/output means associated with the computing device 1100. Data associated with a semantic segmentation system in accordance with the present principles can be presented to a user using an output device of the computing device 1100, such as a display, a printer or any other form of output device.

Figure 11:
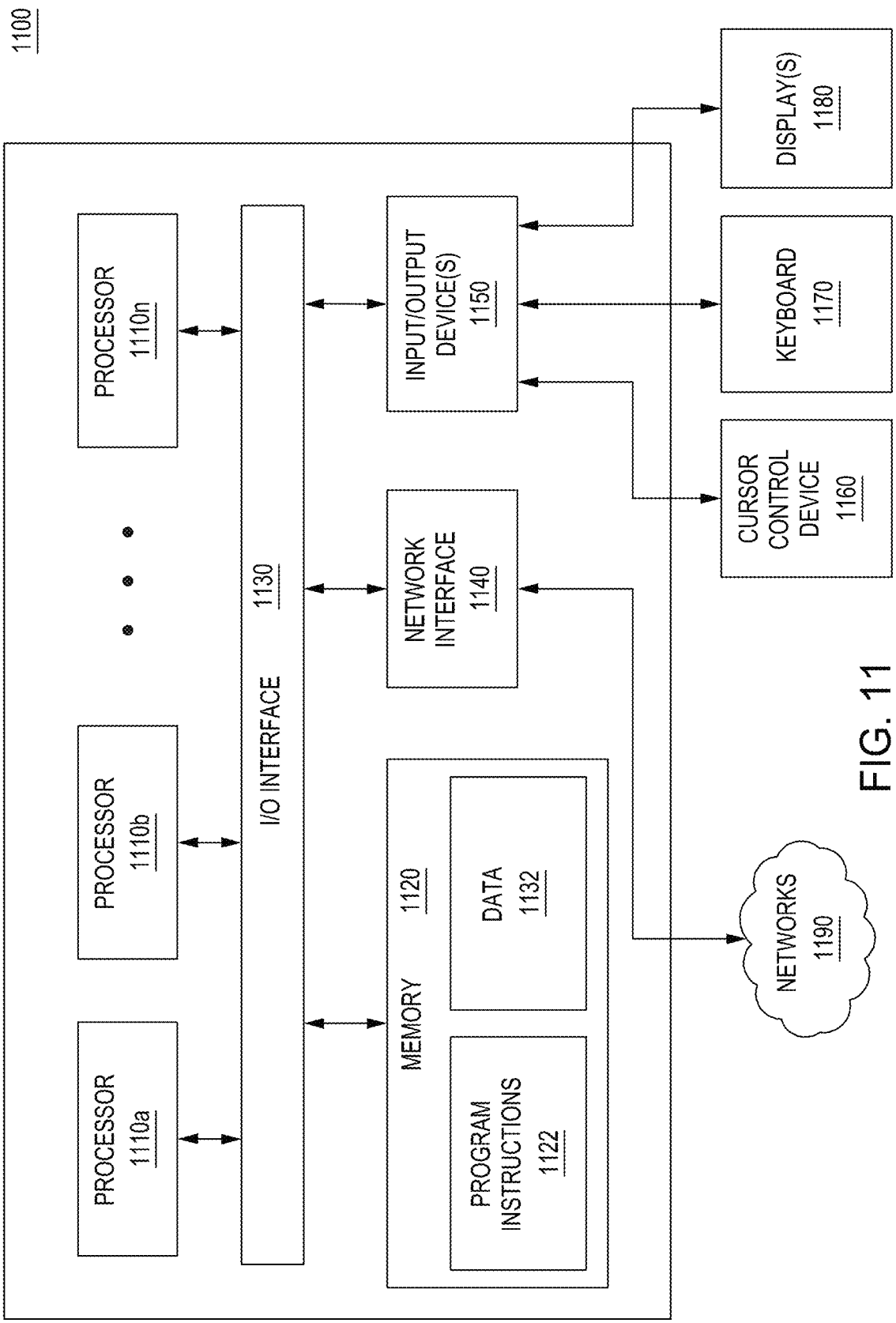
FIG. 11 depicts a high-level block diagram of a computing device suitable for use with a semantic segmentation system in accordance with embodiments of the present principles.

For example, FIG. 11 depicts a high-level block diagram of a computing device 1100 suitable for use with embodiments of a semantic segmentation system in accordance with the present principles such as the semantic segmentation system 100 of FIG. 1. In some embodiments, the computing device 1100 can be configured to implement methods of the present principles as processor-executable executable program instructions 1122 (e.g., program instructions executable by processor(s) 1110) in various embodiments.

In the embodiment of FIG. 11, the computing device 1100 includes one or more processors 1110a-1110n coupled to a system memory 1120 via an input/output (I/O) interface 1130. The computing device 1100 further includes a network interface 1140 coupled to I/O interface 1130, and one or more input/output devices 1150, such as cursor control device 1160, keyboard 1170, and display(s) 1180. In various embodiments, a user interface can be generated and displayed on display 1180. In some cases, it is contemplated that embodiments can be implemented using a single instance of computing device 1100, while in other embodiments multiple such systems, or multiple nodes making up the computing device 1100, can be configured to host different portions or instances of various embodiments. For example, in one embodiment some elements can be implemented via one or more nodes of the computing device 1100 that are distinct from those nodes implementing other elements. In another example, multiple nodes may implement the computing device 1100 in a distributed manner.

In different embodiments, the computing device 1100 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 1100 can be a uniprocessor system including one processor 1110, or a multiprocessor system including several processors 1110 (e.g., two, four, eight, or another suitable number). Processors 1110 can be any suitable processor capable of executing instructions. For example, in various embodiments processors 1110 may be general-purpose or embedded processors implementing any of a variety of instruction set architectures (ISAs). In multiprocessor systems, each of processors 1110 may commonly, but not necessarily, implement the same ISA.

System memory 1120 can be configured to store program instructions 1122 and/or data 1132 accessible by processor 1110. In various embodiments, system memory 1120 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 1120. In other embodiments, program instructions and/or data can be received, sent or stored upon different types of computer-accessible media or on similar media separate from system memory 1120 or computing device 1100.

In one embodiment, I/O interface 1130 can be configured to coordinate I/O traffic between processor 1110, system memory 1120, and any peripheral devices in the device, including network interface 1140 or other peripheral interfaces, such as input/output devices 1150. In some embodiments, I/O interface 1130 can perform any necessary protocol, timing or other data transformations to convert data signals from one component (e.g., system memory 1120) into a format suitable for use by another component (e.g., processor 1110). In some embodiments, I/O interface 1130 can include support for devices attached through various types of peripheral buses, such as a variant of the Peripheral Component Interconnect (PCI) bus standard or the Universal Serial Bus (USB) standard, for example. In some embodiments, the function of I/O interface 1130 can be split into two or more separate components, such as a north bridge and a south bridge, for example. Also, in some embodiments some or all of the functionality of I/O interface 930, such as an interface to system memory 1120, can be incorporated directly into processor 1110.

Network interface 1140 can be configured to allow data to be exchanged between the computing device 1100 and other devices attached to a network (e.g., network 1190), such as one or more external systems or between nodes of the computing device 1100. In various embodiments, network 1190 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 1150 can, in some embodiments, include one or more display terminals, keyboards, keypads, touchpads, scanning devices, voice or optical recognition devices, or any other devices suitable for entering or accessing data by one or more computer systems. Multiple input/output devices 1150 can be present in computer system or can be distributed on various nodes of the computing device 1100. In some embodiments, similar input/output devices can be separate from the computing device 1100 and can interact with one or more nodes of the computing device 1100 through a wired or wireless connection, such as over network interface 1140.

Those skilled in the art will appreciate that the computing device 1100 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 1100 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 1100 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing device 1100 can further include a web browser.

Although the computing device 1100 is depicted as a general purpose computer, the computing device 1100 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 12:
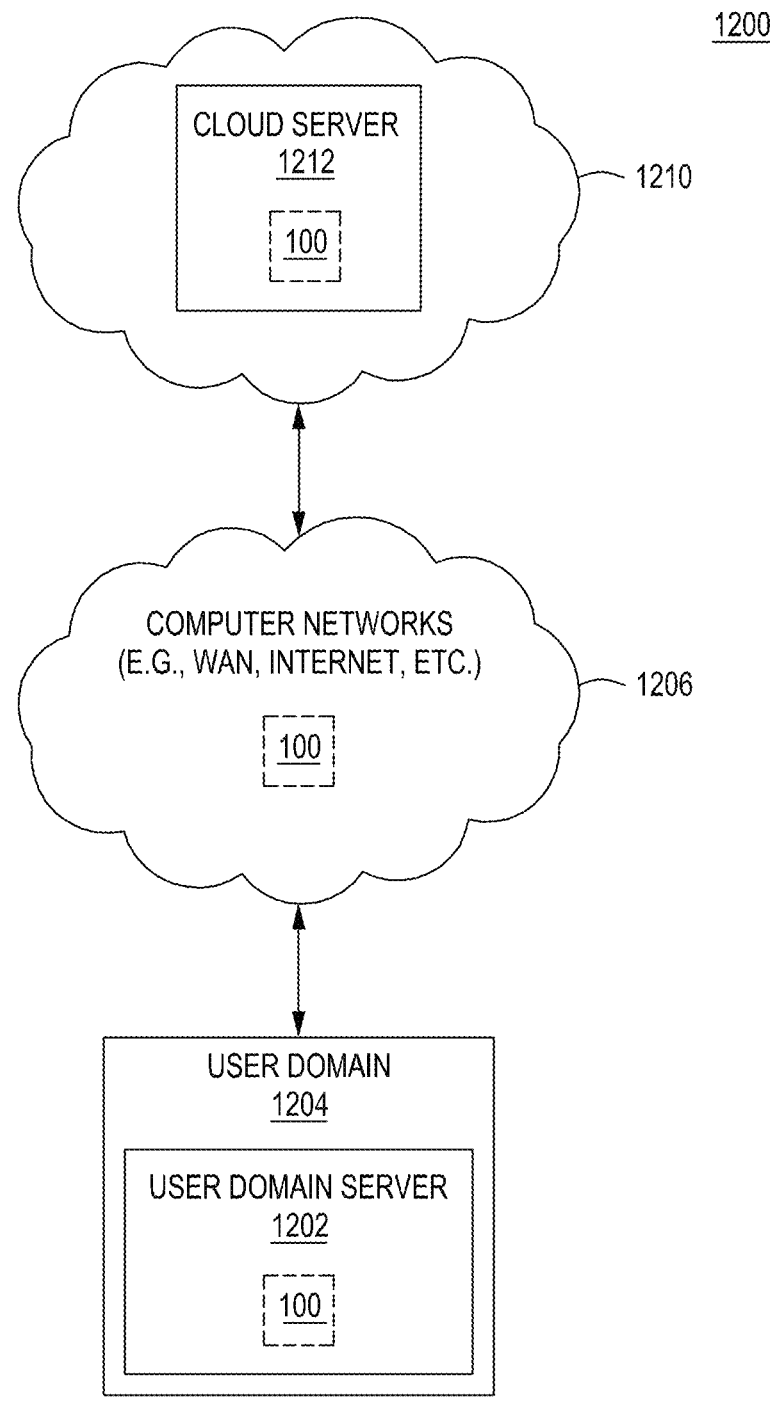
FIG. 12 depicts a high-level block diagram of a network in which embodiments of a semantic segmentation system in accordance with the present principles can be applied.

FIG. 12 depicts a high-level block diagram of a network in which embodiments of a semantic segmentation system in accordance with the present principles, such as the semantic segmentation system 100 of FIG. 1, can be applied. The network environment 1200 of FIG. 12 illustratively comprises a user domain 1202 including a user domain server/computing device 1204. The network environment 1200 of FIG. 12 further comprises computer networks 1206, and a cloud environment 1210 including a cloud server/computing device 1212.

In the network environment 1200 of FIG. 12, a system for semantic segmentation in accordance with the present principles, such as the system 100 of FIG. 1, can be included in at least one of the user domain server/computing device 1204, the computer networks 1206, and the cloud server/computing device 1212. That is, in some embodiments, a user can use a local server/computing device (e.g., the user domain server/computing device 1204) to provide semantic segmentation in accordance with the present principles.

In some embodiments, a user can implement a system for semantic segmentation in the computer networks 1206 to provide semantic segmentation in accordance with the present principles. Alternatively or in addition, in some embodiments, a user can implement a system for semantic segmentation in the cloud server/computing device 1212 of the cloud environment 1210 to provide semantic segmentation in accordance with the present principles. For example, in some embodiments it can be advantageous to perform processing functions of the present principles in the cloud environment 1210 to take advantage of the processing capabilities and storage capabilities of the cloud environment 1210. In some embodiments in accordance with the present principles, a system for providing semantic segmentation in a container network can be located in a single and/or multiple locations/servers/computers to perform all or portions of the herein described functionalities of a system in accordance with the present principles. For example, in some embodiments components of the semantic segmentation system, such as a pre-processing module 110, a ground extraction module, a classification module, and a rules module 140 can be located in one or more than one of the user domain 1202, the computer network environment 1206, and the cloud environment 1210 for providing the functions described above either locally or remotely.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 1100 can be transmitted to the computing device 1100 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

In addition, the various operations, processes, and methods disclosed herein can be embodied in a machine-readable medium and/or a machine accessible medium/storage device compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium/storage device.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for semantic segmentation of 3D point cloud data, comprising:
    determining ground data points of the 3D point cloud data;
    categorizing non-ground data points relative to a ground surface determined from the ground data points to determine legitimate non-ground data points;
    segmenting the determined legitimate non-ground and ground data points based on a set of common features by applying a machine learning algorithm trained using logical rules to segment non-ground and ground data points based on a set of common features, wherein at least some of the common features are defined by the logical rules;
    determining a data structure defining a spatial relationship of the classified, segmented non-ground and ground data points by applying a graph convolutional neural network;
    applying logical rules to the data structure of the features built on the segmented determined non-ground and ground data points based on their spatial relationships and incorporated within a machine learning system; and
    constructing a 3D semantics model from the application of the logical rules to the data structure.

2. The method of claim 1, wherein legitimate non-ground data points comprise non-outlier data points above a ground level.

3. The method of claim 1, wherein determining legitimate non-ground data points, comprises:
    down-sampling the 3D point cloud data to a spatially uniform resolution;
    performing a connected component analysis on the raw 3Dpoint cloud data;

ordering resulting connected components from largest to smallest according to a number of points contained; and fusing a largest number of connected components into scene points.

4. The method of claim 1, wherein the segmenting comprises:

grouping the determined legitimate non-ground and ground data points into superpoints including local groupings of 3D points that are homogenous in terms of the common features.

5. The method of claim 1, wherein the common features comprise at least one of color features, appearance features, geometric relationships and temporal relationships.

6. The method of claim 1, wherein applying the logical rules comprises applying the logical rules as a declarative, first-order logic statements.

7. The method of claim 1, wherein applying the logical rules comprises determining a loss function on a frame by frame basis to determine if the data points comply with the logical rules.

8. The method of claim 1, further comprising:

applying a mesh compression algorithm to data points of the data structure to isolate specific segmented data points having a common feature.

9. A non-transitory machine-readable medium having stored thereon at least one program, the at least one program including instructions which, when executed by a processor, cause the processor to perform a method in a processor based system for semantic segmentation of 3D point cloud data, comprising:

determining ground data points of the 3D point cloud data;

categorizing non-ground data points relative to the ground surface to determine legitimate non-ground data points;

segmenting the determined legitimate non-ground and ground data points based on a set of common features by applying a machine learning algorithm trained using logical rules to segment non-ground and ground data points based on a set of common features, wherein at least some of the common features are defined by the logical rules;

determining a data structure defining a spatial relationship of the classified, segmented non-ground and ground data points by applying a graph convolutional neural network;

applying logical rules to the data structure of the features built on the segmented determined non-ground and ground data points based on their spatial relationships and incorporated within a machine learning system; and constructing a 3D semantics model from the application of the logical rules to the data structure.

10. The non-transitory machine-readable medium of claim 9, wherein legitimate non-ground data points comprise non-outlier data points above a ground level.

11. The non-transitory machine-readable medium of claim 9, wherein determining legitimate non-ground data points, comprises:

down-sampling the 3D point cloud data to a spatially uniform resolution, performing a 26-connected component analysis on the raw 3Dpoint cloud data;

ordering resulting connected components from largest to smallest according to a number of points contained; and fusing a largest number of connected components into scene points.

12. The non-transitory machine-readable medium of claim 9, wherein determining 3D ground data points of the method comprises:

applying a rule-based binary ground versus non ground classifier algorithm to the determined legitimate non-ground data points.

13. The non-transitory machine-readable medium of claim 9, wherein segmenting the determined non-ground and ground data points of the method comprises:

grouping the legitimate non-ground and ground data points into superpoints including local groupings of 3D points that are homogenous in terms of the common features.

14. The non-transitory machine-readable medium of claim 9, wherein applying the logical rules comprises applying the logical rules as declarative, first-order logic statements.

15. The non-transitory machine-readable medium of claim 9, wherein applying the logical rules comprises determining a loss function on a frame by frame basis to determine if the data points comply with the logical rules.

16. The non-transitory machine-readable medium of claim 9, wherein the method further comprises:

applying a mesh compression algorithm to the data points of the data structure to isolate specific segmented data points having a common feature.

17. A system for semantic segmentation of 3D point cloud data, comprising:

a processor; and a memory coupled to the processor, the memory having stored therein at least one of programs or instructions executable by the processor to configure the system to:

determine ground data points of the 3D point cloud data;

categorize the non-ground data points relative to the ground surface to determine legitimate non-ground data points;

segment the determined legitimate non-ground and ground data points based on a set of common features by applying a machine learning algorithm trained using logical rules to segment non-ground and ground data points based on a set of common features, wherein at least some of the common features are defined by the logical rules;

determining a data structure defining a spatial relationship of the classified, segmented non-ground and ground data points by applying a graph convolutional neural network;

apply logical rules to the data structure of the features built on the segmented determined non-ground and ground data points based on their spatial relationships and incorporated within a machine learning system; and construct a 3D semantics model from the application of the logical rules to the data structure.

18. The system of claim 17, wherein the system is configured to:

apply the logical rules as at least one declarative, first-order logic statement.

19. The system of claim 17, wherein the system is further configured to:

apply a mesh compression algorithm to data points of the data structure to isolate specific segmented data points having a common feature.

20. The system of claim 17, wherein the data structure comprises a graph.

* * * * *